US012668250B2

(12) United States Patent
Jun et al.

(10) Patent No.: US 12,668,250 B2
(45) Date of Patent: Jun. 30, 2026

(54) APPARATUS FOR PREDICTING SPEED OF VEHICLE AND METHOD THEREOF

(71) Applicants: HYUNDAI MOTOR COMPANY, Seoul (KR); KIA CORPORATION, Seoul (KR)

(72) Inventors: Eun Ji Jun, Goyang-si (KR); Byeong Wook Jeon, Seoul (KR); Won Seok Jeon, Anyang-si (KR); Ki Sang Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 221 days.

(21) Appl. No.: 18/507,380

(22) Filed: Nov. 13, 2023

(65) Prior Publication Data

US 2025/0050891 A1 Feb. 13, 2025

(30) Foreign Application Priority Data

Aug. 7, 2023 (KR) ........................ 10-2023-0103008

(51) Int. Cl.
| | |
|---|---|
| *B60W 40/105* | (2012.01) |
| *B60W 40/06* | (2012.01) |
| *B60W 50/00* | (2006.01) |
| *G01S 13/08* | (2006.01) |
| *G06N 3/0464* | (2023.01) |

(52) U.S. Cl.
CPC .......... *B60W 40/105* (2013.01); *B60W 40/06* (2013.01); *B60W 50/0097* (2013.01); *G01S 13/08* (2013.01); *G06N 3/0464* (2023.01); *B60W 2420/408* (2024.01); *B60W 2556/10* (2020.02); *B60W 2556/35* (2020.02)

(58) Field of Classification Search
CPC .............. B60W 40/06; B60W 40/105; B60W 50/0097; B60W 2556/10; G06N 3/0464; G06N 3/045
See application file for complete search history.

(56) References Cited

U.S. PATENT DOCUMENTS

| | | | | |
|---|---|---|---|---|
| 2020/0384995 A1* | 12/2020 | Bang | ........................ | G08G 1/22 |
| 2022/0080980 A1* | 3/2022 | Jeong | ................ | B60W 50/0097 |
| 2022/0128685 A1* | 4/2022 | Longman | ................ | G01S 13/92 |

OTHER PUBLICATIONS

H. Zhou, et al, "Informer: Beyond Efficient Transformer for Long Sequence Time-series Forecasting," In Proceedings of the AAAI Conference on Artificial Intelligence, vol. 35, No. 12, 2 pp. 11106-11115, 2021.
A. Vaswani, et al. "Attention is All You Need," Advances in Neural Information Processing Systems, vol. 30, 2017.pdf.

* cited by examiner

*Primary Examiner* — John Kwon
(74) *Attorney, Agent, or Firm* — MCDONNELL BOEHNEN HULBERT & BERGHOFF LLP

(57) ABSTRACT

An apparatus for predicting a speed of a vehicle includes storage that stores a transformer model which completes learning, and a controller that predicts the speed of the vehicle based on the transformer model. The controller may extract feature information about a state of the vehicle from past driving information of the vehicle to input the feature information to an encoder of the transformer model, and extract feature information about the state of the vehicle from future driving information of the vehicle to input the feature information to a decoder of the transformer model.

20 Claims, 10 Drawing Sheets

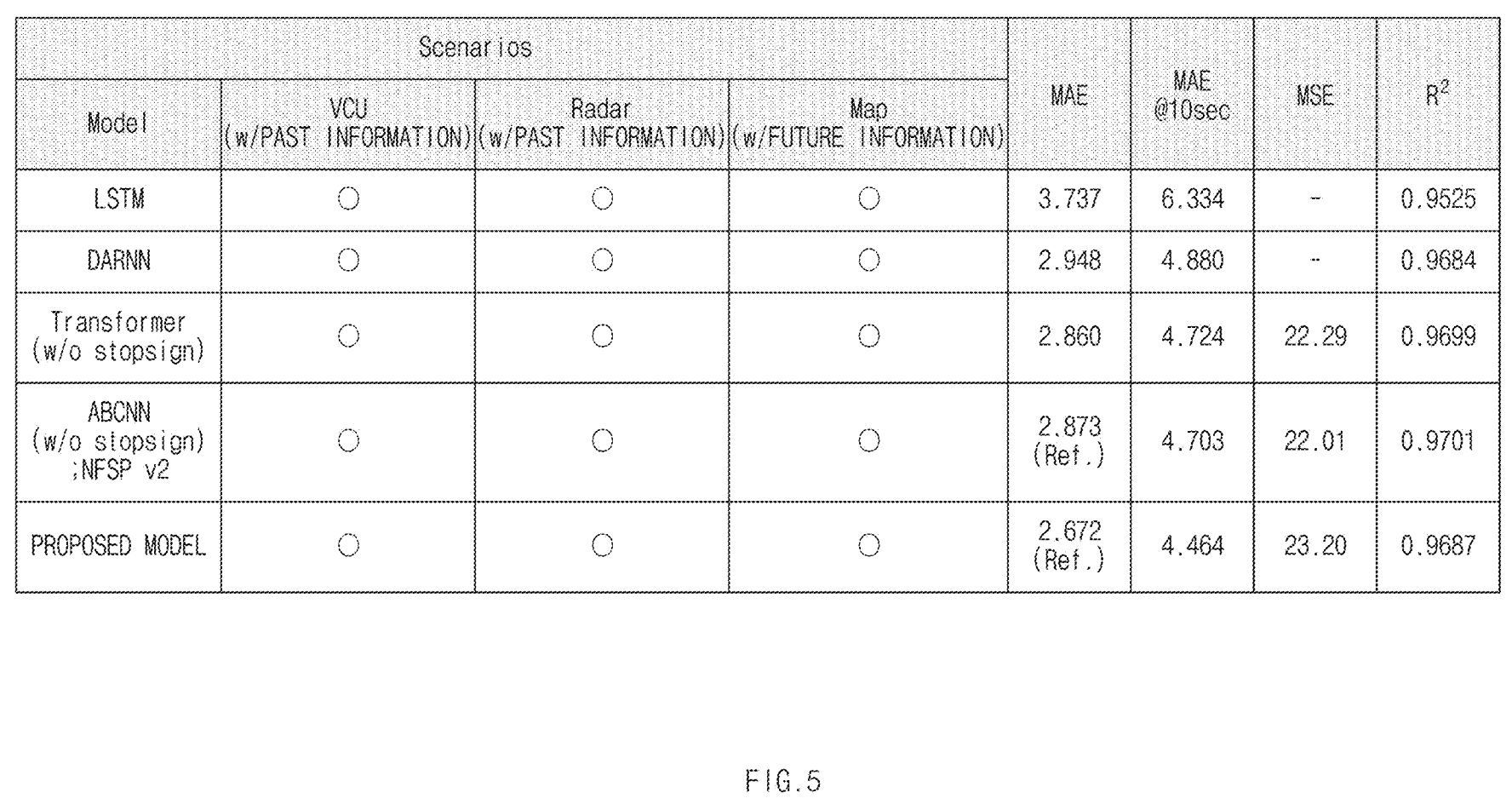

| Model | Scenarios | | | | MAE | MAE @10sec | MSE | $R^2$ |
|---|---|---|---|---|---|---|---|---|
| | VCU (w/PAST INFORMATION) | Radar (w/PAST INFORMATION) | Map (w/FUTURE INFORMATION) | | | | | |
| LSTM | ◯ | ◯ | ◯ | | 3.737 | 6.334 | - | 0.9525 |
| DARNN | ◯ | ◯ | ◯ | | 2.948 | 4.880 | - | 0.9684 |
| Transformer (w/o stopsign) | ◯ | ◯ | ◯ | | 2.860 | 4.724 | 22.29 | 0.9699 |
| ABCNN (w/o stopsign) ;NFSP v2 | ◯ | ◯ | ◯ | | 2.873 (Ref.) | 4.703 | 22.01 | 0.9701 |
| PROPOSED MODEL | ◯ | ◯ | ◯ | | 2.672 (Ref.) | 4.464 | 23.20 | 0.9687 |

FIG.5

| Model | Scenarios | | | MAE | MAE @10sec | MSE | R² |
|---|---|---|---|---|---|---|---|
| | VCJ (w/PAST INFORMATION) | Radar (w/PAST INFORMATION) | Map (w/FUTURE INFORMATION) | | | | |
| ABCNN (w/o stopsign) ;NFSP v2 | ◯ | ◯ | ◯ | 5.161 (Ref.) | 8.529 | 61.86 | 0.9291 |
| PROPOSED MODEL | ◯ | ◯ | ◯ | 4.799 (Ref.) | 8.056 | 55.42 | 0.9365 |

FIG.6

| INPUT SCHEME | MAE | MAE @10sec | MSE | R$^2$ |
|---|---|---|---|---|
| ENCODER SIMULTANEOUS INPUT (COMPARISON SCHEME) | 3.011(-12%) | 4.850 | 23.13 | 0.9688 |
| ENCODER-DECODER SEPARATION SCHEME (PROPOSED SCHEME) | 2.672(Ref.) | 4.464 | 23.20 | 0.9687 |

FIG.7

| Feature Extractor | MAE | MAE @10sec | MSE | $R^2$ |
|---|---|---|---|---|
| 1D Conv (COMPARISON SCHEME) | 2.965(-10%) | 4.794 | 22.91 | 0.9691 |
| MHA (PROPOSED SCHEME) | 2.672(Ref.) | 4.464 | 23.20 | 0.9687 |

FIG.8

APPARATUS FOR PREDICTING SPEED OF VEHICLE AND METHOD THEREOF

CROSS REFERENCE TO RELATED APPLICATIONS

This application claims the benefit of priority to Korean Patent Application No. 10-2023-0103008, filed in the Korean Intellectual Property Office on Aug. 7, 2023, the entire contents of which are incorporated herein by reference.

TECHNICAL FIELD

The present disclosure relates to technology for predicting the speed of a vehicle based on an artificial neural network model.

BACKGROUND

In general, an artificial neural network (ANN), which is a field of artificial intelligence, is an algorithm for allowing a machine to learn made by simulating a human neural structure. Recently, ANN has been applied to image recognition, speech recognition, natural language processing, and the like, and has shown excellent effects. An artificial neural network includes an input layer that receives an input, a hidden layer that actually learns, and an output layer that returns the result of an operation. The artificial neural network including the plurality of hidden layers is called a deep neural network (DNN), which is also a kind of artificial neural network.

An artificial neural network allows a computer to learn by itself based on data. When trying to solve a problem using an artificial neural network, it is necessary to prepare a suitable artificial neural network model and data to be analyzed. An artificial neural network model to solve a problem is trained based on data. Before training the model, it is necessary to first divide the data into two types. This is because the input data and output data required by the artificial neural network model are standardized. Therefore, a process of preprocessing the acquired raw data to suit the requested input data is required. That is, the data should be divided into a train dataset and a validation dataset. The train dataset is used to train the model, and the validation dataset is used to verify the performance of the model.

There are various reasons for validating an artificial neural network model. An artificial neural network developer tunes the model by modifying the hyper parameters of a model based on the validation result of the model. In addition, the model validation is performed to select a suitable model from various models. The reason why the model validation is necessary is explained in more detail as follows.

The first is to predict accuracy. As a result, the purpose of artificial neural networks is to achieve good performance on out-of-sample data not used for training. Therefore, after creating the model, it is essential to check how well the model will perform on out-of-sample data. However, because the model should not be verified using the train dataset, the accuracy of the model should be measured using the validation dataset separated from the train dataset.

The second is to increase the performance of the model by tuning the model. For example, it is possible to prevent overfitting. Overfitting means that the model is over-trained on the train dataset. For example, when the training accuracy is high but the validation accuracy is low, the occurrence of overfitting may be suspected. In addition, it may be understood in more detail through training loss and validation loss. When overfitting occurs, it is necessary to prevent overfitting to increase the validation accuracy. It is possible to prevent overfitting by using a scheme such as regularization or dropout.

Meanwhile, conventional technology for predicting the speed of a vehicle (e.g., recurrent neural network (RNN)-based prediction technology) predicts the speed of the vehicle at a first time point (e.g., 1 second later) to predict the speed of the vehicle at a target time point (e.g., 10 seconds later), predicts the speed of the vehicle at a second time point based on the speed of the vehicle at the first time point, and predicts the speed of the vehicle at the target time (the time point at which the speed of the vehicle is to be predicted) in such a manner (serial scheme) that the speed of the vehicle is predicted at a third time point based on the speed of the vehicle at the second time point.

Such a conventional technology cannot predict the speed of the vehicle at the target time through a single calculation, but requires performing several calculations to predict the speed, so it takes a long time to predict the speed of the vehicle at the target time.

The matters described in this background section are intended to promote an understanding of the background of the disclosure and may include matters that are not already known to those of ordinary skill in the art.

SUMMARY

The present disclosure has been made to solve the above-mentioned problems occurring in the prior art while advantages achieved by the prior art are maintained intact.

An aspect of the present disclosure provides an apparatus for predicting the speed of a vehicle and a method thereof which may extract first feature information about a state of the vehicle from past driving information of the vehicle to input the first feature information to an encoder of a transformer model, and extract second feature information about the state of the vehicle from future driving information of the vehicle to input the second feature information to a decoder of the transformer model in order to predict the speed of the vehicle based on the transformer model, thereby predicting the speed of the vehicle with high accuracy.

Another aspect of the present disclosure provides an apparatus for predicting the speed of a vehicle and a method thereof which may extract first feature information about the state of the vehicle from a radar signal, extract second feature information about the state of the vehicle from a vehicle control signal, integrate the first feature information and the second feature information to input the fused result to an encoder of the transformer, extract third feature information about the state of the vehicle from token information, extract fourth feature information about the state of the vehicle from front road information of the vehicle, and integrate the third feature information and the fourth feature information to input the fused result to a decoder of the transformer in order to predict the speed of the vehicle based on the transformer model, thereby predicting the speed of the vehicle with high accuracy.

The technical problems to be solved by the present disclosure are not limited to the aforementioned problems, and any other technical problems not mentioned herein will be clearly understood from the following description by those skilled in the art to which the present disclosure pertains. Also, it may be easily understood that the objects and advantages of the present disclosure may be realized by the units and combinations thereof recited in the claims.

According to an aspect of the present disclosure, an apparatus for predicting a speed of a vehicle includes storage that stores a transformer model which completes learning, and a controller that predicts the speed of the vehicle based on the transformer model.

According to an embodiment, the controller may extract feature information about a state of the vehicle from past driving information of the vehicle to input the feature information to an encoder of the transformer model, and extract feature information about the state of the vehicle from future driving information of the vehicle to input the feature information to a decoder of the transformer model.

According to an embodiment, the controller may receive a radar signal through a vehicle network and extract first feature information about the state of the vehicle from the radar signal based on a first 1D convolutional neural network (CNN).

According to an embodiment, the radar signal may include at least one of a separation distance from a front vehicle and a relative speed.

According to an embodiment, the controller may receive a vehicle control signal through the vehicle network and extract second feature information about the state of the vehicle from the vehicle control signal based on a second 1D CNN.

According to an embodiment, the vehicle control signal may include at least one of a vehicle speed, a steering angle, a longitudinal acceleration of the vehicle, a lateral acceleration of the vehicle, a front wheel motor torque of the vehicle, a rear wheel motor torque of the vehicle, a brake hydraulic pressure, an accelerator pedal sensor (APS) value, and a brake pedal sensor (BPS) value.

According to an embodiment, the controller may fuse the first feature information and the second feature information based on a fully connected neural network (FCNN), and input a fused result to the encoder of the transformer.

According to an embodiment, the controller may generate token information and extract third feature information about the state of the vehicle from the token information based on a 1D convolutional neural network (CNN).

According to an embodiment, the token information may include start token information and placeholder token information, the start token information includes a past speed of the vehicle, and the placeholder token information includes a zero vector.

According to an embodiment, the controller may receive front road information of the vehicle from a navigation device and extract fourth feature information about the state of the vehicle from the road information based on a multi-head attention (MHA) scheme.

According to an embodiment, the road information may include at least one of a type of a road, a curvature of the road, a slope of the road, traffic light information on the road, a location of a crosswalk on the road, a location of a speed bump on the road, a location of a speed camera on the road, and a location of a traffic accident.

According to an embodiment, the controller may fuse the third feature information and the fourth feature information based on a cross attention scheme and input a fused result to the decoder of the transformer.

According to an aspect of the present disclosure, a method of predicting a speed of a vehicle includes storing, by storage, a transformer model which completes learning, and predicting, by a controller, the speed of the vehicle based on the transformer model.

According to an embodiment, the predicting of the speed of the vehicle may include inputting, by the controller, feature information to an encoder of the transformer model by extracting the feature information about a state of the vehicle from past driving information of the vehicle, and inputting, by the controller, feature information to a decoder of the transformer model by extracting the feature information about the state of the vehicle from future driving information of the vehicle.

According to an embodiment, the inputting to the encoder of the transformer model may include receiving, by the controller, a radar signal through a vehicle network, extracting, by the controller, first feature information about the state of the vehicle from the radar signal based on a first 1D convolutional neural network (CNN), receiving, by the controller, a vehicle control signal through the vehicle network, and extracting, by the controller, second feature information about the state of the vehicle from the vehicle control signal based on a second 1D CNN.

According to an embodiment, the inputting to the encoder of the transformer model may include integrating, by the controller, the first feature information and the second feature information based on a fully connected neural network (FCNN), and inputting, by the controller, a fused result to the encoder of the transformer.

According to an embodiment, the inputting to the decoder of the transformer model may include generating, by the controller, token information, extracting, by the controller, third feature information about the state of the vehicle from the token information based on a 1D convolutional neural network (CNN), receiving, by the controller, front road information of the vehicle from a navigation device, and extracting, by the controller, fourth feature information about the state of the vehicle from the road information based on a multi-head attention (MHA) scheme.

According to an embodiment, the inputting to the decoder of the transformer model may include integrating, by the controller, the third feature information and the fourth feature information based on a cross attention scheme, and inputting, by the controller, a fused result to the decoder of the transformer.

BRIEF DESCRIPTION OF THE FIGURES

The above and other objects, features and advantages of the present disclosure will be more apparent from the following detailed description taken in conjunction with the accompanying drawings:

FIG. 5 is a diagram of a first example of the performance of an apparatus for predicting a speed of a vehicle according to an embodiment of the present disclosure;

FIG. 6 is a diagram of a second example of the performance of an apparatus for predicting a speed of a vehicle according to an embodiment of the present disclosure;

FIG. 7 is a diagram of a third example of the performance of an apparatus for predicting a speed of a vehicle according to an embodiment of the present disclosure;

FIG. 8 is a diagram of a fourth example of the performance of an apparatus for predicting a speed of a vehicle according to an embodiment of the present disclosure;

DETAILED DESCRIPTION

Figure 1:
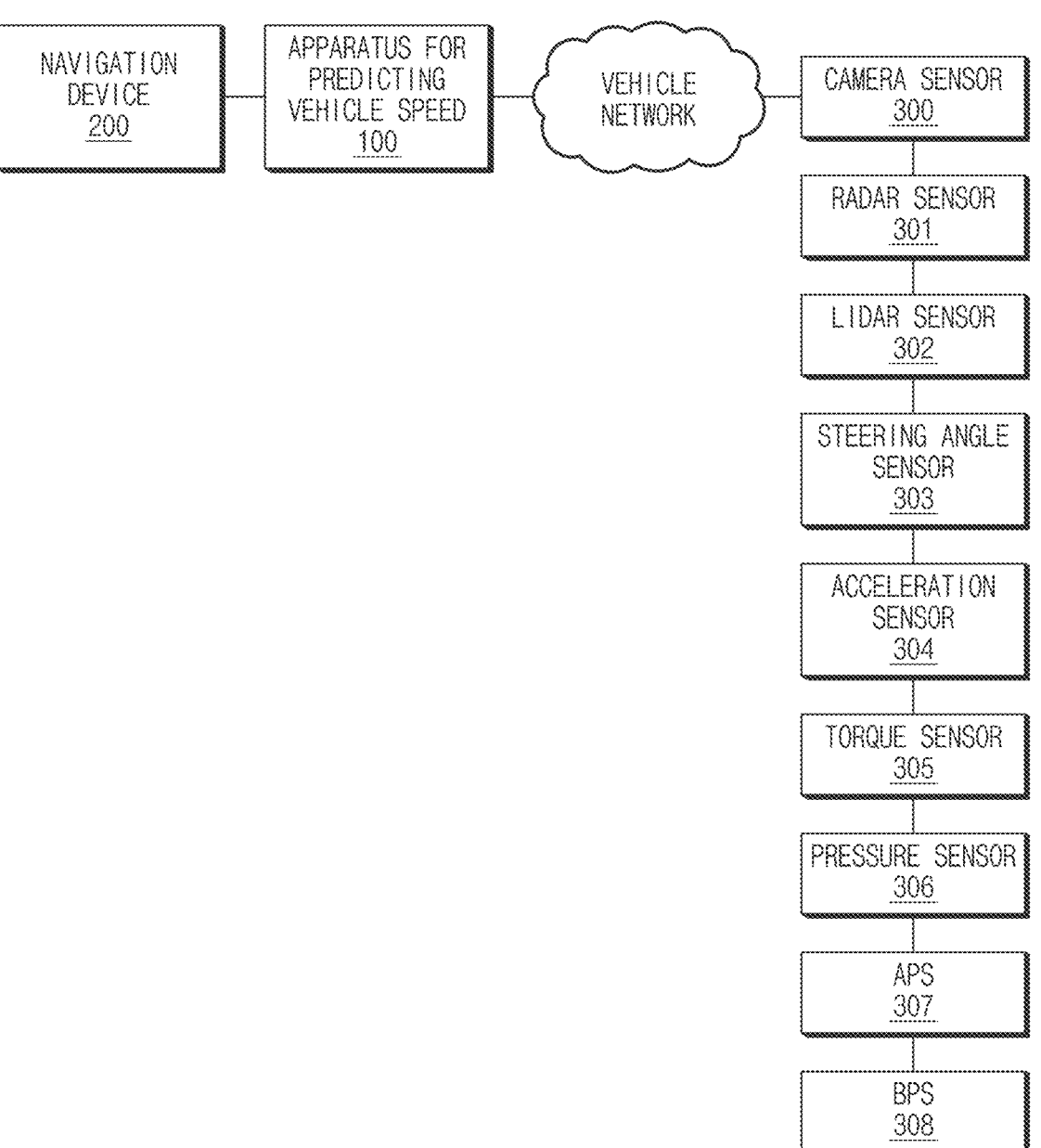
FIG. 1 is a block diagram illustrating a system for predicting a speed of a vehicle according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a system for predicting a speed of a vehicle according to an embodiment of the present disclosure.

As shown in FIG. 1, a system for predicting a speed of a vehicle according to an embodiment of the present disclosure may include an apparatus 100 for predicting a speed of a vehicle, a navigation device 200, a camera sensor 300, a radio detection and ranging (radar) sensor 301, and a light detection and ranging (LiDAR) sensor 302, a steering angle sensor 303, an acceleration sensor 304, a torque sensor 305, a pressure sensor 306, an accelerator pedal sensor (APS) 307, and a brake pedal sensor (BPS) 308. In this case, depending on a scheme of implementing a system for predicting a speed of a vehicle according to an embodiment of the present disclosure, components may be combined with each other to be implemented as one, or some components may be omitted.

Regarding each component, first, the apparatus 100 for predicting a speed of a vehicle may predict the speed of the vehicle based on a transformer model which is a core component of the present disclosure.

The navigation device 200 may provide, as information on a front road of the vehicle, a type of road (highway, general road, intersection, and the like), a curvature of the road, a slope of the road, traffic light information (location, lighting information, and the like) on the road, a location of a crosswalk on the road, a location of a speed bump on the road, a location of a speed camera on the road, and a location of a traffic accident to the apparatus 100 for predicting a speed of a vehicle.

The camera sensor 300 may capture images around the vehicle. The camera sensor may include a front camera that captures an image in front of the vehicle, a left camera that captures an image of the left side of the vehicle, a right camera that captures an image of the right side of the vehicle, and a rear camera that captures an image of the rear of the vehicle.

The radar sensor 301 may measure the distances to surrounding vehicles and the relative speeds of the surrounding vehicles. The radar sensor 301 may include at least one of a first radar sensor located in the front of the vehicle to measure the distance and relative speed to a vehicle in front, and a second radar sensor located in the left side of the vehicle to measure the distance and relative speed to a vehicle in the left side, a third radar sensor located in the right side of the vehicle to measure the distance and relative speed to a vehicle in the right side, and a fourth radar sensor located at the rear of the vehicle to measure the distance and relative speed to a vehicle in the rear side.

The LiDAR sensor 302, which is a module that generates 3D images of objects around the vehicle, may track the speed of the vehicle as well as the driving paths of surrounding objects.

The steering angle sensor 303 may measure the steering angle of the vehicle.

The acceleration sensor 304 may measure the longitudinal acceleration as well as the lateral acceleration of the vehicle.

The torque sensor 305 may measure the torque of a front wheel motor and the torque of a rear wheel motor of the vehicle. In this case, the torque sensor 305 may include a first torque sensor that measures the torque of the front wheel motor of the vehicle and a second torque sensor that measures the torque of the rear wheel motor of the vehicle.

The pressure sensor 306 may measure the hydraulic pressure applied to a hydraulic brake.

The APS 307 is a sensor that measures a degree of depression (hereinafter, referred to as APS value) of the accelerator pedal provided in the vehicle. When the driver does not operate the accelerator pedal (APS OFF), the APS value is 0%. When the driver fully depresses the accelerator pedal, the APS value is 100%.

The BPS 308 is a sensor that measures a degree of depression (hereinafter, referred to as BPS value) of the brake pedal provided in the vehicle. When the driver does not operate the brake pedal (BPS OFF), the BPS value is 0%. When the driver fully depresses the brake pedal, the BPS value is 100%.

Figure 2:
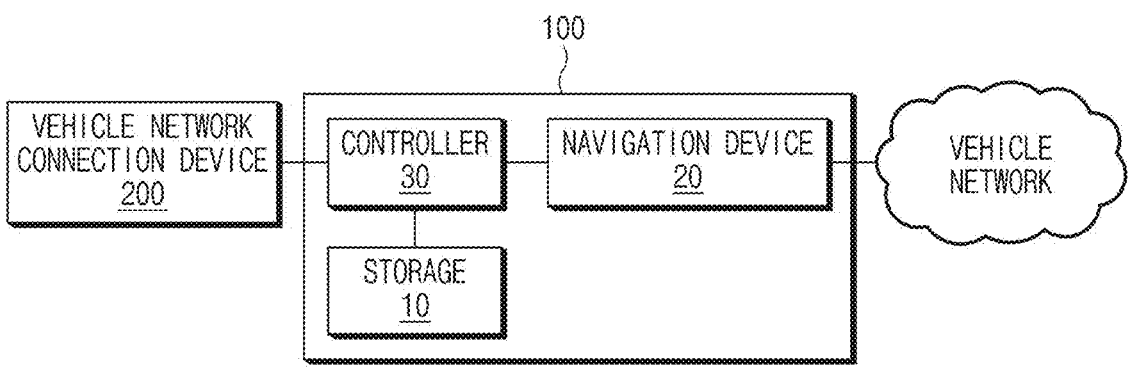
FIG. 2 is a block diagram illustrating an apparatus for predicting a speed of a vehicle according to an embodiment of the present disclosure.

FIG. 2 is a block diagram illustrating an apparatus for predicting a speed of a vehicle according to an embodiment of the present disclosure.

As shown in FIG. 2, the apparatus 100 for predicting a speed of a vehicle according to an embodiment of the present disclosure may include storage 10, a vehicle network connection device 20, and a controller 30. In this case, depending on a scheme of implementing the apparatus 100 for predicting a speed of a vehicle according to an embodiment of the present disclosure, components may be combined with each other to be implemented as one, or some components may be omitted.

Regarding each component, first, the storage 10 may store an informer-style transformer model. In this case, the informer-style transformer model, which is a model suitable for long-sequence time series prediction, may perform predictions effectively and quickly while reducing computational complexity for long-length time series data. In addition, the informer-style transformer model may include a generative-style decoder. The informer-style transformer model is a model that is trained based on a dataset.

The storage 10 may store various logic, algorithms and programs required in the process of extracting first feature information about a state of the vehicle from past driving information of the vehicle to input the first feature information to an encoder of the transformer model, and extracting second feature information about the state of the vehicle from future driving information of the vehicle to input the second feature information to a decoder of the transformer model in order to predict the speed of the vehicle based on the transformer model.

In this case, the past driving information and future driving information of the vehicle may be multi-modal. For reference, multi-modal refers to an environment where communication with a computer is performed in various forms and meanings. In multi-modal, modal means modality, and modality refers to a communication channel used in an interaction process. In this case, interaction refers to a form of communication, that is, two-way communication rather than one-way communication. Multi-modal interface is a user-friendly technology that enables natural communication between humans and computers by combining various input schemes such as voice, gesture, gaze, facial expression, and biosignal in addition to traditional text. In the past, information was input in a form that was easy for machines to understand, but recently it has developed into a form that is easy for users to understand.

The storage 10 may store various logic, algorithms and programs required in the process of extracting first feature information about the state of the vehicle from a radar signal, extracting second feature information about the state of the vehicle from a vehicle control signal, integrating the first feature information and the second feature information to input the fused result to an encoder of the transformer, extracting third feature information about the state of the vehicle from token information, extracting fourth feature information about the state of the vehicle from front road information of the vehicle, and integrating the third feature information and the fourth feature information to input the fused result to a decoder of the transformer in order to predict the speed of the vehicle based on the transformer model.

The storage 10 may include at least one type of a storage medium of memories of a flash memory type, a hard disk type, a micro type, a card type (e.g., a secure digital (SD) card or an extreme digital (XD) card), and the like, and a random access memory (RAM), a static RAM, a read-only memory (ROM), a programmable ROM (PROM), an electrically erasable PROM (EEPROM), a magnetic memory (MRAM), a magnetic disk, and an optical disk type memory.

The vehicle network connection device 20, which provides a connection interface with a vehicle network, may allow the controller 30 to obtain various information (or data) from the vehicle network. In this case, the vehicle network may include a controller area network (CAN), a controller area network with flexible data-rate (CAN FD), a local interconnect network (LIN), FlexRay, media oriented systems transport (MOST), an Ethernet, and the like.

The controller 30 may perform overall control such that each component performs its function. The controller 30 may be implemented in the form of hardware or software, or may be implemented in a combination of hardware and software. Preferably, the controller 30 may be implemented as a microprocessor, but is not limited thereto.

The controller 30 may predict the speed of the vehicle based on the transformer model. In particular, the controller 30 may predict the speed of the vehicle based on the informer-style transformer model.

The controller 30 may extract the first feature information about the state of the vehicle from past driving information of the vehicle, input the first feature information to the encoder of the transformer model, extract the second feature information about the state of the vehicle from future driving information of the vehicle, and input the second feature information to the decoder of the transformer model, so that it is possible to predict the speed of the vehicle with high accuracy. In this case, the past driving information of the vehicle, which is a term referring to the past driving information of the vehicle for 10 seconds, may include a radar signal and a vehicle control signal, and the future driving information of the vehicle may include information on the road ahead on which the vehicle is scheduled to drive and token information.

Hereinafter, the operations of the controller 30 will be described in detail with reference to FIGS. 3 and 4.

Figure 3:
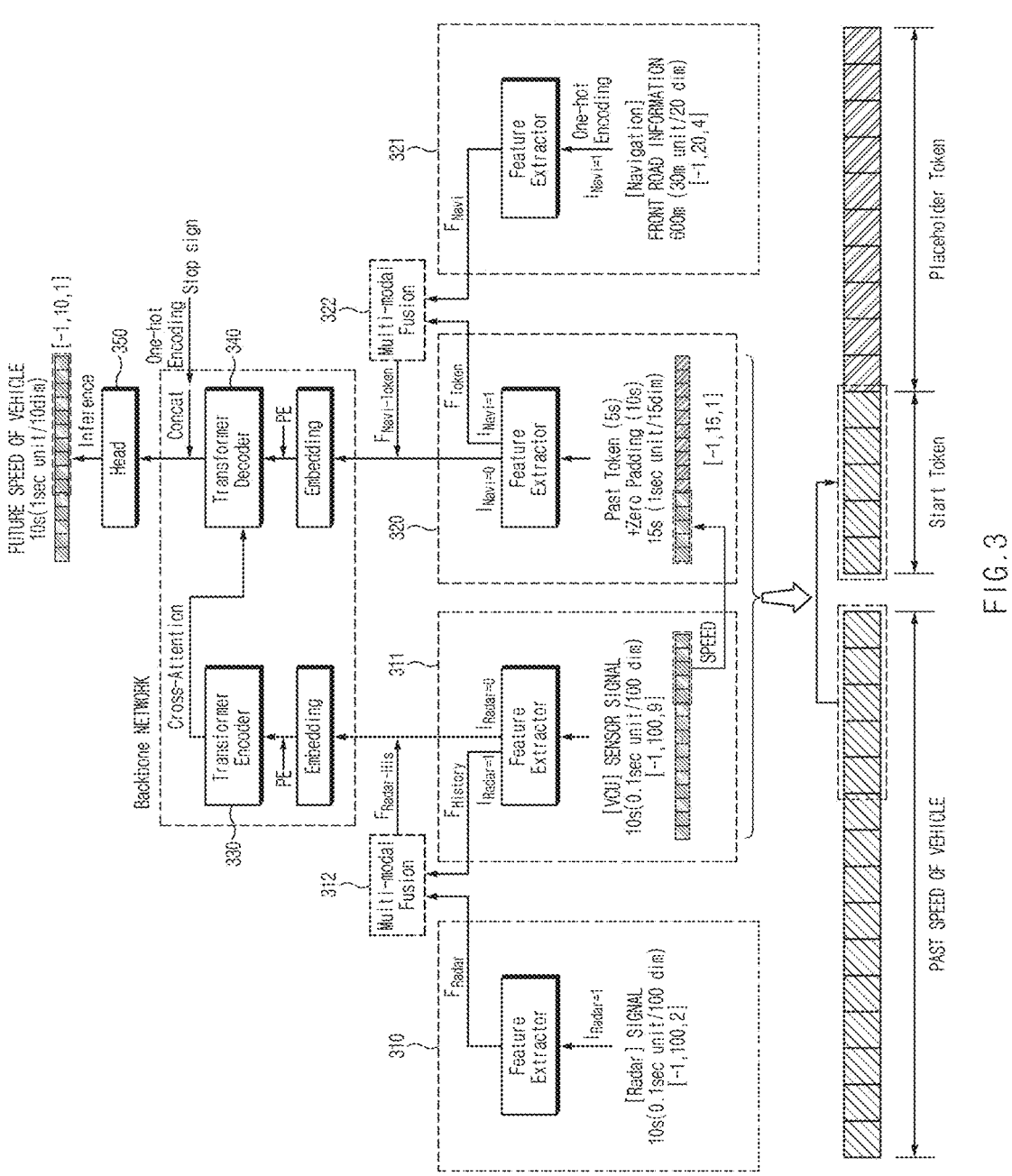
FIG. 3 is a diagram illustrating a process in which a controller provided in an apparatus for predicting a speed of a vehicle according to an embodiment of the present disclosure predicts the vehicle speed.

FIG. 3 is a diagram illustrating a process in which a controller provided in an apparatus for predicting a speed of a vehicle according to an embodiment of the present disclosure predicts the vehicle speed.

In operation 310, the controller 30 extracts first feature information $F_{Radar}$ about the state of the vehicle from the radar signal. For example, the controller 30 may extract the first feature information about the state of the vehicle from the radar signal by using the 1D CNN. In this case, a total of 100 dimensions may be received from the radar sensor 301 at a period of 0.1 seconds for 10 seconds, and the radar signal may include information about the distance to a front vehicle and the relative speed to the front vehicle. In addition, $I_{Radar}=1$ indicates that a radar signal is input, and $I_{Radar}=0$ indicates that any radar signals are not input.

In operation 311, the controller 30 extracts the second feature information $F_{History}$ about the state of the vehicle from the vehicle control signal (i.e., a vehicle control unit (VCU) sensor signal). For example, the controller 30 may extract the second feature information about the state of the vehicle from the vehicle control signal by using the 1D CNN. In this case, the vehicle control signal may receive a total of 100 dimensions for the vehicle control signal may be received from various sensors for 10 seconds at a period of a 0.1 seconds. In addition, the vehicle control signal may include at least one of a vehicle speed, a steering angle, a longitudinal acceleration of the vehicle, a lateral acceleration of the vehicle, a front wheel motor torque of the vehicle, a rear wheel motor torque of the vehicle, a brake hydraulic pressure, an APS value, and a BPS value.

In operation 312, the controller 30 may fuse the first feature information extracted in operation 310 and the second feature information extracted in operation 311. For example, the controller 30 may fuse first feature information and the second feature information based on fully connected neural networks (FCNN). The fusion operation of the past information (first feature information and second feature information) is as shown in FIG. 4. For reference, the FCNN connects the feature maps of all layers. That is, the feature map of the previous layer is concatenated with the feature maps of all subsequent layers. In this case, the concatenation is not addition.

Thereafter, the controller 30 may input information $F_{Radar\text{-}His}$ obtained by fusing the first feature information and the second feature information to an encoder 330 of the transformer. That is, the controller 30 may input past information to the encoder 330 of the transformer.

In operation 320, the controller 30 extracts the third feature information $F_{Token}$ about the state of the vehicle from the token information. For example, the controller 30 may extract the third feature information about the state of the vehicle from the token information by using the 1D CNN. In this case, the token information may include a total of 15 dimensions for 15 seconds in units of one second, where the initial 5 dimensions (i.e., start token information) may include the speed obtained for 5 seconds in the period of one second among the vehicle control signal, and the remaining 10 dimensions (i.e., placeholder token information) may include a zero vector.

In operation 321, the controller 30 extracts the fourth feature information $F_{Navi}$ about the state of the vehicle from information on the front road of the vehicle. For example, the controller 30 may extract the fourth feature information about the state of the vehicle from the information on the front road of the vehicle by using a multi-head attention scheme. In this case, the road information of a total of 20 dimensions up to 600 m in units of 30 m in front of the vehicle may be input. In addition, the road information may include at least one of a type of road (highway, general road, intersection, and the like), a curvature of the road, a slope of the road, traffic light information (location, lighting information, and the like) on the road, a location of a crosswalk on the road, a location of a speed bump on the road, a location of a speed camera on the road, and a location of a traffic accident. For reference, attention refers to a technique that calculates a score by which all hidden states of the decoder are closest to which hidden state of the encoder, and MHA, which is a scheme considering the overall context of the front road of the vehicle, performs self-attention as many as the number of heads, and calculates the final attention score by adding up the attention scores from each head. In addition, $I_{Navi}=1$ indicates that the information on the front road of the vehicle is input, and $I_{Navi}=0$ indicates that information on the front road of the vehicle is not input.

In operation 322, the controller 30 may fuse the third feature information extracted in operation 320 and the fourth feature information extracted in operation 321. For example, the controller 30 may fuse the third feature information and the second feature information based on a cross attention scheme. The fusion operation of the future information (third feature information and fourth feature information) is as shown in FIG. 4. For reference, the cross attention refers to an attention mechanism within a transformer used to mix two different embedding sequences.

Thereafter, the controller 30 may input information $F_{Navi\text{-}Token}$ obtained by fusing the third feature information and the fourth feature information to a decoder 340 of the transformer. That is, the controller 30 may input future information to the decoder 340 of the transformer.

Thereafter, the controller 30 may predict the future speed of the vehicle based on a head (Inference Layer) 350. That is, the controller 30 may predict the vehicle speed for 10 seconds in the future.

Meanwhile, when $I_{Radar}=0$ in operation 311, the controller 30 may input the second feature information $F_{History}$ about the state of the vehicle extracted from the vehicle control signal (i.e., a vehicle control unit (VCU) sensor signal) to the encoder 330 of the transformer.

In addition, when $I_{Navi}=0$ in operation 320, the controller 30 may input the third feature information $F_{Token}$ about the state of the vehicle extracted from the token information to the decoder 340 of the transformer.

Figure 4:
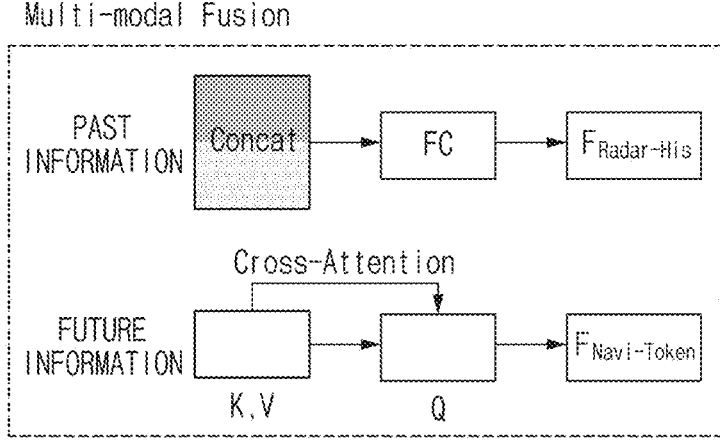
FIG. 4 is a diagram illustrating a process in which a controller provided in an apparatus for predicting a speed of a vehicle according to an embodiment of the present disclosure fuses past information and future information, respectively.

FIG. 4 is a diagram illustrating a process in which a controller provided in an apparatus for predicting a speed of a vehicle according to an embodiment of the present disclosure fuses past information and future information.

As shown in FIG. 4, the past information may include the first feature information and the second feature information, and the controller 30 may fuse ($F_{Radar\text{-}His}$) the first feature information $F_{Radar}$ and the second feature information $F_{History}$.

In addition, the future information may include the third feature information and the fourth feature information, and the controller 30 may fuse ($F_{Navi\text{-}Token}$) the third feature information $F_{Token}$ and the fourth feature information $F_{Navi}$.

Hereinafter, the performance of an apparatus for predicting a speed of a vehicle according to an embodiment of the present disclosure will be described with reference to FIGS. 5 to 8.

FIG. 5 is a diagram illustrating the first example of the performance of an apparatus for predicting a speed of a vehicle according to an embodiment of the present disclosure, and illustrates a simulation result based on a first dataset (e.g., Michigan dataset).

As shown in FIG. 5, a long short-term memory (LSTM) has a mean absolute error (MAE) of 3.737 and $R^2$ of 0.9525. A dual-stage attention-based recurrent neural network (DARNN) has an MAE of 2.948 and $R^2$ of 0.9684. A non-informer style transformer has a MAE of 2.860, a mean squared error (MSE) of 22.29, and $R^2$ of 0.9699. An attention-based convolutional neural network (ABCNN) has MAE of 2.873, MSE of 22.01, and $R^2$ of 0.9701. The proposed model (the present disclosure) has MAE of 2.672, MSE of 23.20, and $R^2$ of 0.9687. In the end, it may be understood that the performance of the proposed model is the best for the first dataset. In this case, $R^2$ means a coefficient of determination.

FIG. 6 is a diagram illustrating the second example of the performance of an apparatus for predicting a speed of a vehicle according to an embodiment of the present disclosure, and illustrates a simulation result based on a second data set (e.g., an actual vehicle data set).

As shown in FIG. 6, ABCNN has MAE of 5.161, MSE of 61.86, and $R^2$ of 0.9291. To the contrary, the proposed model has MAE of 4.799, MSE of 55.42, and $R^2$ of 0.9365. In the end, it may be understood that the performance of the proposed model is better than that of ABCNN for the second dataset.

FIG. 7 is a diagram illustrating the third example of the performance of an apparatus for predicting a speed of a vehicle according to an embodiment of the present disclosure, and illustrates the performance of a scheme of separately inputting past driving information and future driving information of a vehicle.

As shown in FIG. 7, in a comparison scheme (i.e., a scheme being compared), MAE is 3.011, MSE is 23.13, and $R^2$ is 0.9688. To the contrary, in the proposed scheme, MAE is 4.464, MSE is 23.20, and $R^2$ is 0.9687. In the end, it may be understood that the proposed scheme improves performance by about 12% compared to the comparison scheme.

For reference, the comparison scheme is a scheme of inputting the past driving information and future driving information of the vehicle to the encoder 330 of the transformer without separating the past driving information and future driving information from each other. For example, the comparison scheme means a scheme of fusing the first feature information and the second feature information, re-fusing the fused result, the second feature information, and the fourth feature information, inputting the re-fused result to the encoder 330 of the transformer, and inputting the third feature information to the decoder 340 of the transformer.

FIG. 8 is a diagram illustrating the fourth example of the performance of an apparatus for predicting a speed of a vehicle according to an embodiment of the present disclosure, and illustrates the performance of a scheme using MHA to extract the fourth feature information $F_{Navi}$ about the state of the vehicle from the front road information of the vehicle in operation 321.

As shown in FIG. 8, a scheme of using 1D CNN to extract the fourth feature information $F_{Navi}$ about the state of the vehicle from the front road information of the vehicle has MAE of 2.965, MAE of 4.794, and $R^2$ of 22.91. To the contrary, the scheme using MHA (i.e., a scheme being compared) has MAE of 2.672, MAE of 4.464, and $R^2$ of 23.20. In the end, it may be understood that the scheme using MHA (i.e. the proposed scheme) improves performance by about 10% compared to the scheme using 1D CNN.

Figure 9:
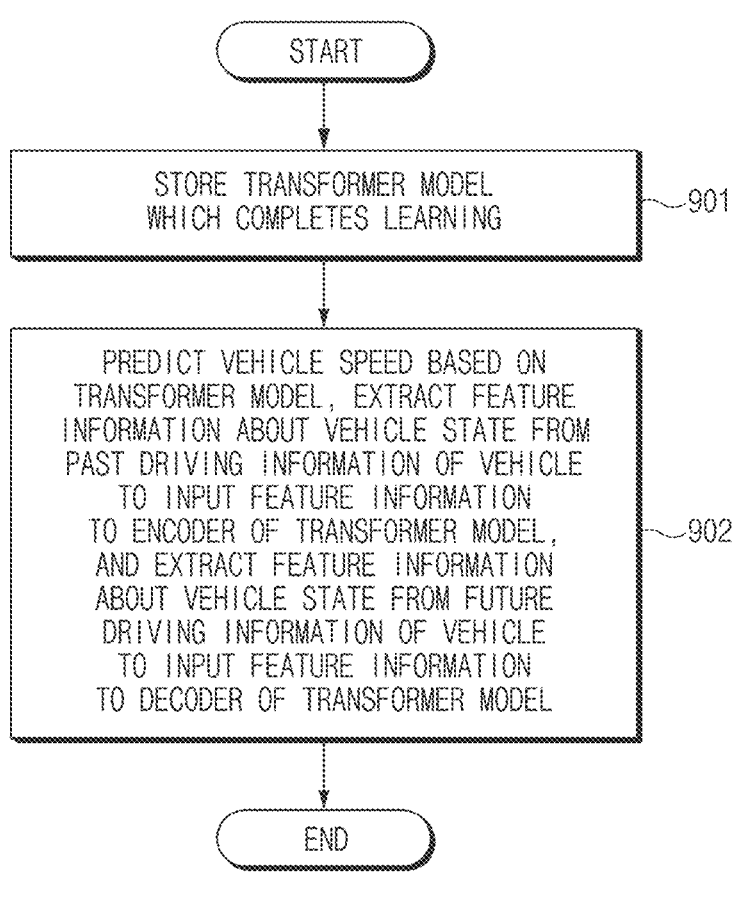
FIG. 9 is a flowchart illustrating a method of predicting a speed of a vehicle according to an embodiment of the present disclosure.

FIG. 9 is a flowchart illustrating a method of predicting a speed of a vehicle according to an embodiment of the present disclosure.

First, in 901, the storage stores a transformer model which completes learning.

Then, in 902, the controller 30 predicts a speed of a vehicle based on the transformer model, extracts feature information about a state of the vehicle from past driving information of the vehicle to input the feature information to an encoder of the transformer model, and extract feature information about the state of the vehicle from future driving information of the vehicle to input the feature information to a decoder of the transformer model.

Figure 10:
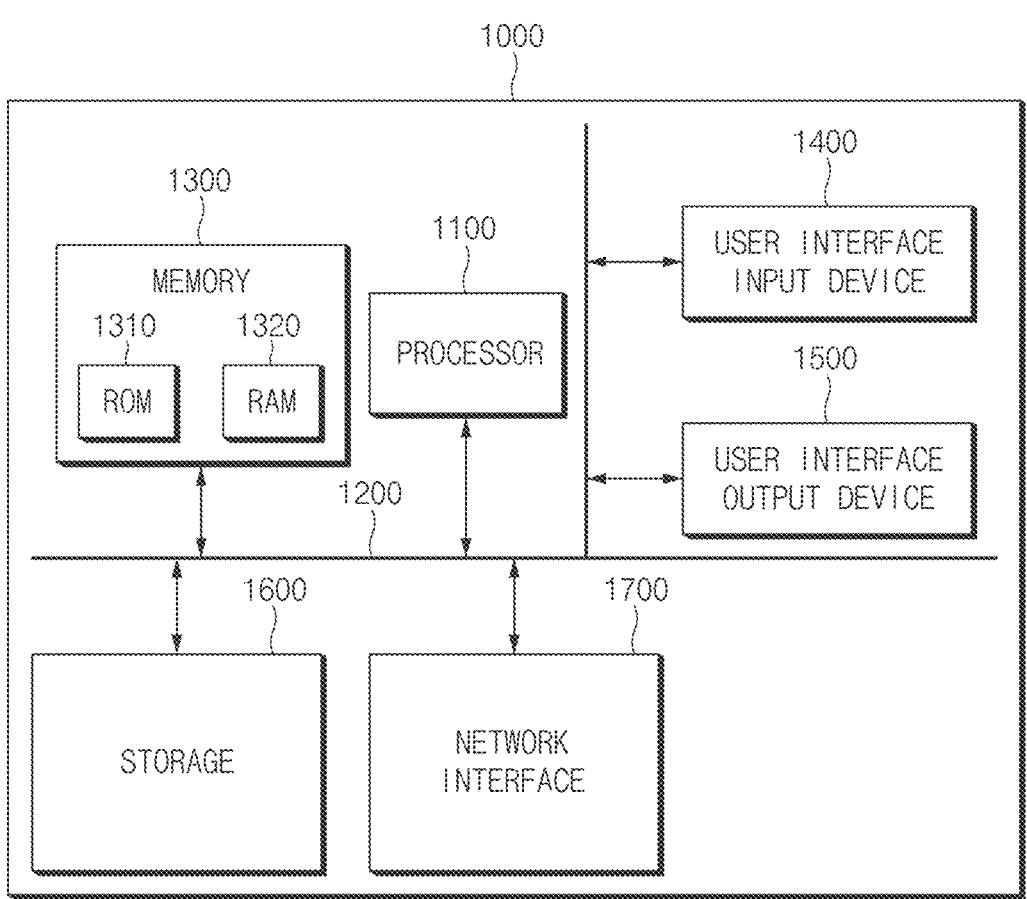
FIG. 10 is a block diagram illustrating a computing system for executing a method of predicting a speed of a vehicle according to an embodiment of the present disclosure.

FIG. 10 is a block diagram illustrating a computing system for executing a method of predicting a speed of a vehicle according to an embodiment of the present disclosure.

Referring to FIG. 10, a method of predicting a speed of a vehicle according to an embodiment of the present disclosure described above may be implemented through a computing system. A computing system 1000 may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor 1100 and the storage medium may reside in an application specific integrated circuit (ASIC). The ASIC may reside in a user terminal. In another method, the processor and the storage medium may reside in the user terminal as an individual component.

According to the embodiments of the present disclosure, it is possible to predict the speed of the vehicle with high accuracy by extracting first feature information about a state of the vehicle from past driving information of the vehicle to input the first feature information to an encoder of a transformer model, and extracting second feature information about the state of the vehicle from future driving information of the vehicle to input the second feature information to a decoder of the transformer model in order to predict the speed of the vehicle based on the transformer model.

Although exemplary embodiments of the present disclosure have been described for illustrative purposes, those skilled in the art will appreciate that various modifications, additions and substitutions are possible, without departing from the scope and spirit of the disclosure. Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

The invention claimed is:

1. An apparatus for predicting a speed of a vehicle, the apparatus comprising:
a storage configured to store a transformer model which completes learning; and
a controller configured to predict the speed of the vehicle based on the transformer model;
wherein the controller is further configured to extract feature information about a state of the vehicle from past driving information of the vehicle, to input the feature information to an encoder of the transformer model, and to extract feature information about the state of the vehicle from future driving information of the vehicle to input the feature information to a decoder of the transformer model.

2. The apparatus of claim 1, wherein the controller is further configured to receive a radar signal through a vehicle network and extract first feature information about the state of the vehicle from the radar signal based on a first 1D convolutional neural network (CNN).

3. The apparatus of claim 2, wherein the radar signal includes at least one of a separation distance from a front vehicle and a relative speed.

4. The apparatus of claim 2, wherein the controller is further configured to receive a vehicle control signal through the vehicle network, and to extract second feature information about the state of the vehicle from the vehicle control signal based on a second 1D CNN.

5. The apparatus of claim 4, wherein the vehicle control signal includes at least one of a vehicle speed, a steering angle, a longitudinal acceleration of the vehicle, a lateral acceleration of the vehicle, a front wheel motor torque of the vehicle, a rear wheel motor torque of the vehicle, a brake hydraulic pressure, an accelerator pedal sensor (APS) value, and a brake pedal sensor (BPS) value.

6. The apparatus of claim 4, wherein the controller is further configured to fuse the first feature information and the second feature information based on a fully connected neural network (FCNN), and to input a fused result to the encoder of the transformer.

7. The apparatus of claim 1, wherein the controller is further configured to generate token information and extract third feature information about the state of the vehicle from the token information based on a 1D convolutional neural network (CNN).

8. The apparatus of claim 7, wherein the token information includes start token information and placeholder token information, and wherein the start token information includes a past speed of the vehicle, and the placeholder token information includes a zero vector.

9. The apparatus of claim 7, wherein the controller is further configured to receive front road information of the vehicle from a navigation device, and to extract fourth feature information about the state of the vehicle from the road information based on a multi-head attention (MHA) scheme.

10. The apparatus of claim 9, wherein the road information includes at least one of a type of a road, a curvature of the road, a slope of the road, traffic light information on the road, a location of a crosswalk on the road, a location of a speed bump on the road, a location of a speed camera on the road, and a location of a traffic accident.

11. The apparatus of claim 9, wherein the controller is further configured to fuse the third feature information and the fourth feature information based on a cross attention scheme and input a fused result to the decoder of the transformer.

12. A method of predicting a speed of a vehicle, the method comprising:

storing, by a storage, a transformer model which completes learning; and predicting, by a controller, the speed of the vehicle based on the transformer model;

wherein the predicting of the speed of the vehicle includes:

inputting, by the controller, feature information to an encoder of the transformer model by extracting the feature information about a state of the vehicle from past driving information of the vehicle; and inputting, by the controller, feature information to a decoder of the transformer model by extracting the feature information about the state of the vehicle from future driving information of the vehicle.

13. The method of claim 12, wherein inputting feature information to the encoder of the transformer model includes:

receiving, by the controller, a radar signal through a vehicle network;

extracting, by the controller, first feature information about the state of the vehicle from the radar signal based on a first 1D convolutional neural network (CNN);

receiving, by the controller, a vehicle control signal through the vehicle network; and extracting, by the controller, second feature information about the state of the vehicle from the vehicle control signal based on a second 1D CNN.

14. The method of claim 13, wherein inputting feature information to the encoder of the transformer model further includes:

integrating, by the controller, the first feature information and the second feature information based on a fully connected neural network (FCNN); and inputting, by the controller, a fused result to the encoder of the transformer.

15. The method of claim 13, wherein the radar signal includes at least one of a separation distance from a front vehicle and a relative speed.

16. The method of claim 13, wherein the vehicle control signal includes at least one of a vehicle speed, a steering angle, a longitudinal acceleration of the vehicle, a lateral acceleration of the vehicle, a front wheel motor torque of the vehicle, a rear wheel motor torque of the vehicle, a brake hydraulic pressure, an accelerator pedal sensor (APS) value, and a brake pedal sensor (BPS) value.

17. The method of claim 12, wherein inputting feature information to the decoder of the transformer model includes:

generating, by the controller, token information;

extracting, by the controller, third feature information about the state of the vehicle from the token information based on a 1D convolutional neural network (CNN);

receiving, by the controller, front road information of the vehicle from a navigation device; and extracting, by the controller, fourth feature information about the state of the vehicle from the road information based on a multi-head attention (MHA) scheme.

18. The method of claim 17, wherein inputting feature information to the decoder of the transformer model further includes:

integrating, by the controller, the third feature information and the fourth feature information based on a cross attention scheme; and inputting, by the controller, a fused result to the decoder of the transformer.

19. The method of claim 17, wherein the token information includes start token information and placeholder token information, the start token information includes a past speed of the vehicle, and the placeholder token information includes a zero vector.

20. The method of claim 17, wherein the road information includes at least one of a type of a road, a curvature of the road, a slope of the road, traffic light information on the road, a location of a crosswalk on the road, a location of a speed bump on the road, a location of a speed camera on the road, and a location of a traffic accident.

* * * * *